(12) United States Patent
Baize et al.

(10) Patent No.: US 7,007,472 B2
(45) Date of Patent: Mar. 7, 2006

(54) SYSTEM FOR LIMITING TURBOCHARGER ROTATIONAL SPEED

(75) Inventors: Scott R. Baize, Greenwood, IN (US); Jason V. Dukes, Columbus, IN (US); Norbert J. Rehm, IV, Whiteland, IN (US); Dave L. Dunnuck, Columbus, IN (US)

(73) Assignee: Cummins, Inc., Columbus, IN (US)

(*) Notice: Subject to any disclaimer, the term of this patent is extended or adjusted under 35 U.S.C. 154(b) by 0 days.

(21) Appl. No.: 10/775,385

(22) Filed: Feb. 10, 2004

(65) Prior Publication Data

US 2005/0172627 A1   Aug. 11, 2005

(51) Int. Cl.
F02B 33/44 (2006.01)
F02D 23/00 (2006.01)

(52) U.S. Cl. .......................................... 60/602; 60/611
(58) Field of Classification Search ................ 60/602, 60/611, 605.1; 701/100; 123/559.1, 564
See application file for complete search history.

(56) References Cited

U.S. PATENT DOCUMENTS

| | | | |
|---|---|---|---|
| 4,046,003 A | 9/1977 | Armstrong et al. ......... 701/100 |
| 4,277,830 A | 7/1981 | Reid et al. .................. 701/102 |
| 4,604,701 A | 8/1986 | Fujawa et al. ............... 60/603 |
| 5,594,665 A | 1/1997 | Walter et al. ............... 701/100 |
| 5,755,101 A | 5/1998 | Free et al. .................... 60/602 |
| 5,829,254 A * | 11/1998 | Hayashi et al. .............. 60/602 |
| 6,155,050 A | 12/2000 | Blanz et al. .................. 60/603 |
| 6,163,254 A | 12/2000 | Smith et al. ................ 701/101 |
| 6,298,718 B1 | 10/2001 | Wang ......................... 701/100 |
| 6,298,728 B1 | 10/2001 | Fekete et al. ............. 73/514.39 |
| 6,401,457 B1 | 6/2002 | Wang et al. .................. 60/602 |
| 6,424,906 B1 | 7/2002 | Zhu et al. ................... 701/115 |
| 6,480,782 B1 | 11/2002 | Brackney et al. ............. 60/602 |
| 6,497,227 B1 | 12/2002 | Wang et al. .................. 60/611 |
| 6,539,714 B1 | 4/2003 | Wang ......................... 60/611 |
| 6,637,205 B1 * | 10/2003 | Ahmad et al. ................ 60/611 |
| 6,644,029 B1 * | 11/2003 | Weinreuter ................... 60/602 |
| 6,698,203 B1 * | 3/2004 | Wang ......................... 60/611 |
| 6,779,344 B1 * | 8/2004 | Hartman et al. .............. 60/602 |
| 2002/0100463 A1 | 8/2002 | Jaliwala et al. ............. 60/605.2 |
| 2002/0144674 A1 | 10/2002 | Wang et al. .................. 60/602 |
| 2003/0145591 A1 | 8/2003 | Arnold ........................ 60/602 |
| 2003/0177765 A1 | 9/2003 | Wang ......................... 60/602 |
| 2003/0216856 A1 | 11/2003 | Jacobson .................... 701/114 |

* cited by examiner

Primary Examiner—Sheldon J Richter
(74) Attorney, Agent, or Firm—Barnes & Thornburg LLP

(57) ABSTRACT

A system for limiting the rotational speed of a turbocharger is disclosed. The turbocharger includes a compressor having an outlet fluidly coupled to an intake manifold of an internal combustion engine and a compressor outlet, a turbine having an inlet fluidly coupled to an exhaust manifold of the engine and an outlet. A control computer is configured to compute a maximum compressor outlet pressure value as a function of the compressor inlet pressure, the compressor inlet temperature, an operating condition other than the compressor inlet pressure or temperature and a maximum allowable turbocharger speed value, and to control a turbine swallowing capacity or efficiency control mechanism in a manner that limits compressor outlet pressure to the maximum compressor outlet pressure value to thereby limit rotational speed of the turbocharger to the maximum turbocharger speed value. The operating condition may be, for example, engine intake air flow rate or engine speed.

8 Claims, 4 Drawing Sheets

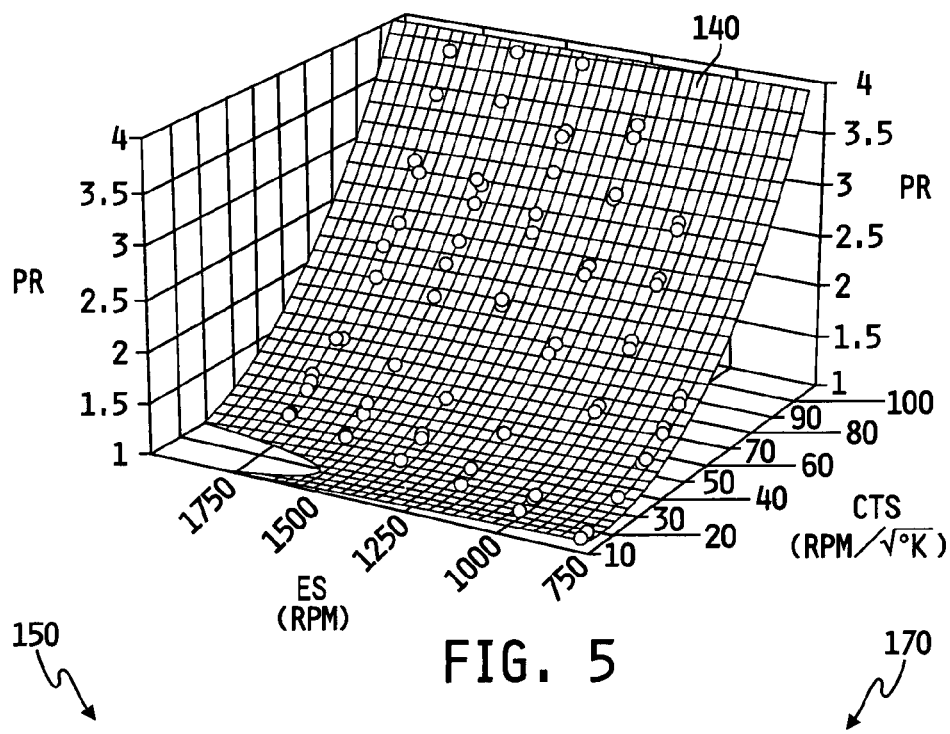
FIG. 5
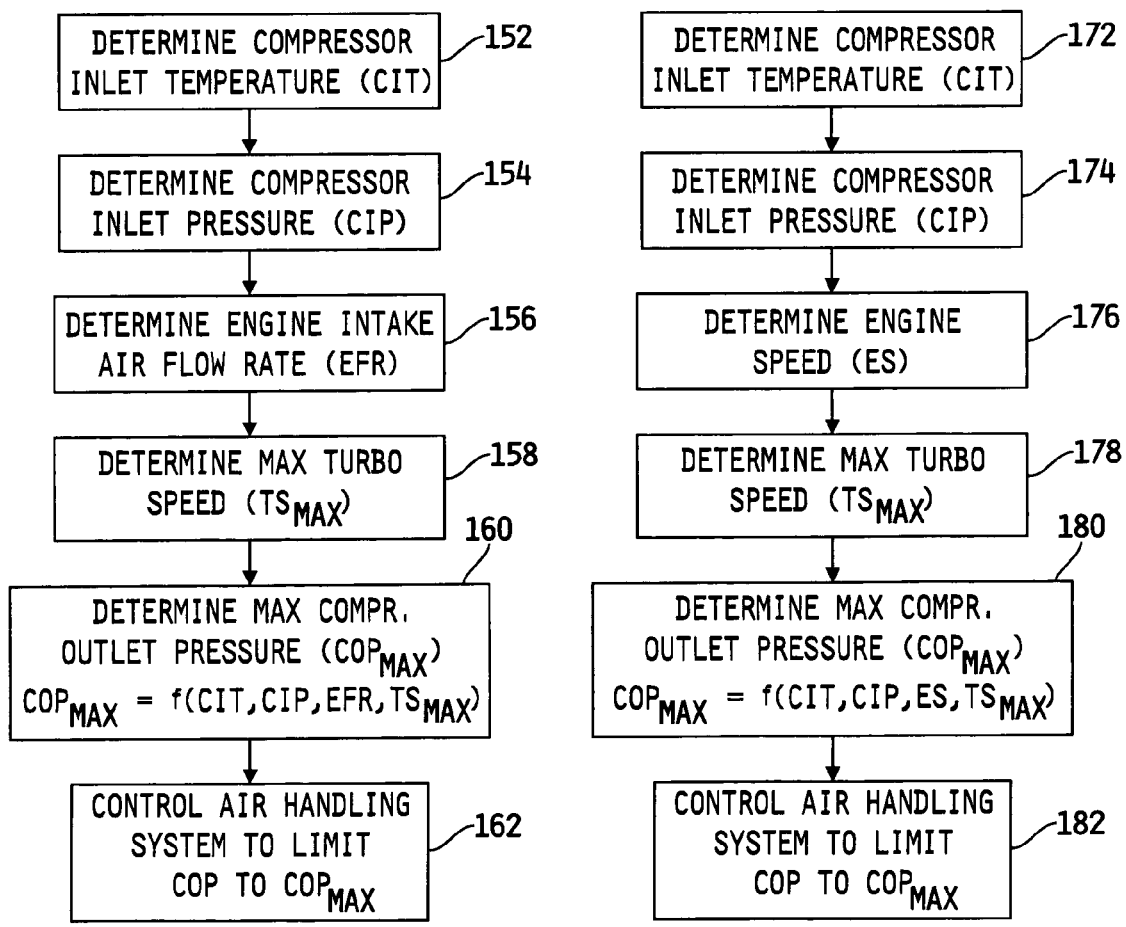
FIG. 6
FIG. 7

SYSTEM FOR LIMITING TURBOCHARGER ROTATIONAL SPEED

FIELD OF THE INVENTION

The present invention relates generally to systems for limiting turbocharger rotational speed, and more specifically to systems for preventing turbocharger overspeed conditions without requiring a turbocharger rotational speed sensor.

BACKGROUND OF THE INVENTION

Turbochargers are well known devices for pressurizing intake air entering the combustion chambers of an internal combustion engine to thereby increase the efficiency and power output of the engine. In general, pressurizing the intake air increases the quantity of air entering the engine cylinders during the intake stroke, and this allows more fuel to be utilized in establishing a desired air-to-fuel ratio. Increased available engine output torque and power is thereby realized. In a turbocharged engine, the exhaust manifold of the engine is fluidly coupled to a turbine of the turbocharger, and the exhaust gas flowing to the turbine causes a turbine wheel to rotate at a speed determined by the pressure and flow rate of exhaust gas. A compressor wheel within a compressor of the turbocharger is mechanically coupled to the turbine wheel, and is therefore rotatably driven by the turbine wheel. An inlet of the compressor receives fresh ambient air, and an outlet of the compressor is fluidly coupled to the intake manifold of the engine. The rotatably driven action of the compressor wheel increases the amount of intake air supplied to the intake conduit, thereby resulting in an increased, or so-called "boost", pressure therein. In such systems it may be desirable to limit the rotational speed of the turbocharger to avoid turbocharger overspeed conditions.

SUMMARY OF THE INVENTION

The present invention may comprise one or more of the following features and combinations thereof. A system for limiting turbocharger rotational speed may comprise a turbocharger having a compressor defining a compressor outlet fluidly coupled to an intake manifold of an internal combustion engine and a compressor inlet, and having a turbine defining an exhaust gas inlet fluidly coupled to an exhaust manifold of the engine and an exhaust gas outlet. A first pressure sensor may produce a first pressure signal indicative of pressure at the compressor inlet. A first temperature sensor may produce a first temperature signal indicative of temperature at the compressor inlet. Means may be provided for determining an operating condition other than the pressure and the temperature at the compressor inlet, and producing a corresponding operating condition indicator. A control mechanism may be provided for controlling a swallowing capacity or efficiency of the turbine. A control computer may be configured to determine a maximum compressor outlet pressure value as a function of the first pressure signal, the first temperature signal, the operating condition indicator and a maximum turbocharger speed value, and to control the control mechanism in a manner that limits compressor outlet pressure to the maximum compressor outlet pressure value to thereby limit rotational speed of the turbocharger to the maximum turbocharger speed value.

The means for determining an operating condition may be a means for determining an engine intake air flow rate corresponding to a flow rate of air entering the engine via the intake manifold, wherein the operating condition indicator is an engine intake air flow rate indicator. This embodiment may further include an engine speed sensor producing an engine speed signal indicative of rotational speed of the engine, a second pressure sensor producing a second pressure signal indicative of pressure at the outlet of the compressor; and a second temperature sensor producing a second temperature signal indicative of temperature within the intake manifold, wherein the means for determining an engine intake air flow rate may includes means for estimating the engine intake air flow rate indicator in the form of an engine intake air flow rate value as a function of the engine speed signal, the second pressure signal and the second temperature signal. Alternatively or additionally, the means for determining an engine intake air flow rate may include a mass air flow sensor producing the engine intake air flow rate indicator in the form of an engine intake air flow rate signal corresponding to flow rate of air supplied from the compressor outlet to the intake manifold. In either case, the system may further include a memory having a three-dimensional map stored therein, and this map may have a first dimension in the form of a compressor pressure ratio defined by a ratio of the compressor outlet pressure and the pressure of air at the compressor inlet, a second dimension in the form of a corrected maximum turbocharger speed value computed as a function of the maximum turbocharger speed value and the first temperature signal, and a third dimension in the form of a corrected mass air flow computed as a function of the engine air inlet flow rate indicator, the first pressure signal and the first temperature signal. The control computer may be operable to determine the maximum compressor outlet pressure value by mapping current values of the corrected maximum turbocharger speed value and the corrected mass air flow to a current value of the compressor pressure ratio via the map and then multiplying the mapped value of the compressor pressure ratio by a current value of the first pressure signal.

Alternatively, the means for determining an operating condition may be an engine speed sensor producing an engine speed signal indicative of engine rotational speed, and the operating condition indicator may be the engine speed signal. The system may further include a memory having a three-dimensional map stored therein, and this map may have a first dimension in the form of a compressor pressure ratio defined by a ratio of the compressor outlet pressure and the pressure of air at the compressor inlet, a second dimension in the form of a corrected maximum turbocharger speed value computed as a function of the maximum turbocharger speed value and the first temperature signal, and a third dimension in the form of engine speed. The control computer may be operable to determine the maximum compressor outlet pressure value by mapping current values of the corrected maximum turbocharger speed value and the engine speed signal to a current value of the compressor pressure ratio via the map and then multiplying the mapped value of the compressor pressure ratio by a current value of the first pressure signal.

In either case, the control mechanism may include the turbine configured as a variable geometry turbine, and the variable geometry turbine may be responsive to a control signal produced by the control computer to modify the swallowing capacity of the turbine.

Alternatively or additionally, the control mechanism may include a wastegate fluidly coupled between the exhaust gas inlet and the exhaust gas outlet of the turbine, and the wastegate may be responsive to a control signal produced by the control computer to selectively modify the efficiency of the turbine by diverting exhaust gas therethrough and away from the exhaust gas inlet of the turbine.

Alternatively or additionally, the control mechanism may include an exhaust throttle responsive to a control signal produced by the control computer to selectively modify the efficiency of the turbine by controlling the flow rate of exhaust gas through the turbine.

The system may further include a second pressure sensor producing a second pressure signal indicative of the compressor outlet pressure, and the control computer may be configured to control any one or more of the control mechanisms in a manner that limits the compressor outlet pressure to the maximum compressor outlet pressure value by determining a pressure error corresponding to a difference between the maximum compressor outlet pressure and the second pressure signal, and by controlling the control mechanism in a manner that minimizes the pressure error.

These and other objects of the present invention will become more apparent from the following description of the illustrative embodiments.

BRIEF DESCRIPTION OF THE DRAWINGS

FIG. 5 is a 3-D plot of another illustrative technique for estimating maximum allowable compressor outlet pressure values by mapping a corrected maximum allowable turbocharger speed and current values of engine speed to maximum allowable turbocharger compressor ratio values.

FIG. 6 is a flowchart of one illustrative software algorithm for limiting turbocharger rotational speed to a maximum turbocharger rotational speed by limiting turbocharger compressor outlet pressure to a corresponding maximum turbocharger compressor outlet pressure.

FIG. 7 is a flowchart of another illustrative software algorithm for limiting turbocharger rotational speed to a maximum turbocharger rotational speed by limiting turbocharger compressor outlet pressure to a corresponding maximum turbocharger compressor outlet pressure.

DESCRIPTION OF THE ILLUSTRATIVE EMBODIMENTS

Figure 1:
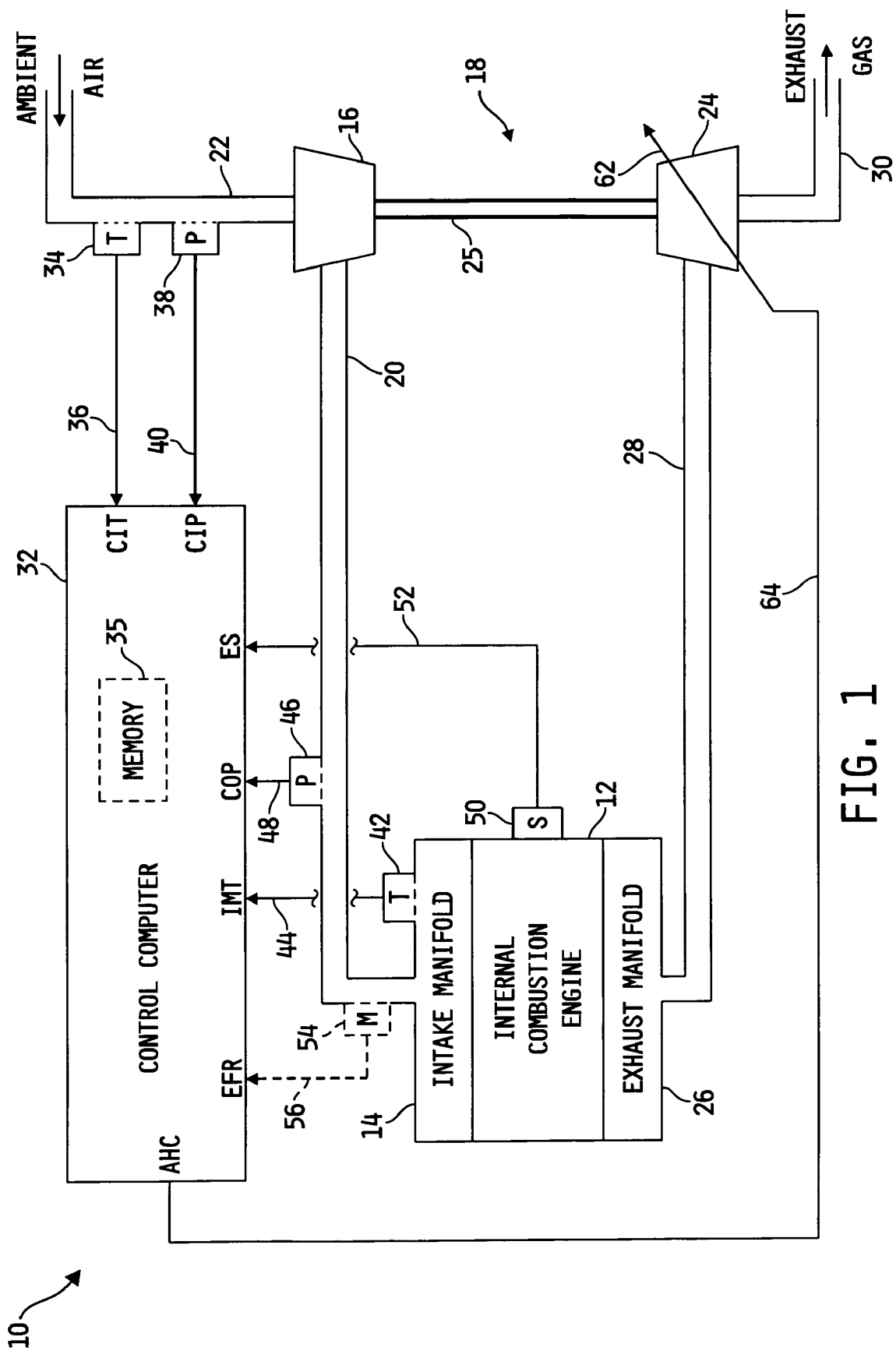
FIG. 1 is a schematic and block diagram of one illustrative embodiment of a system for limiting turbocharger rotational speed.

For the purposes of promoting an understanding of the principles of the invention, reference will now be made to a number of illustrative embodiments illustrated in the drawings and specific language will be used to describe the same.

Referring now to FIG. 1, one illustrative embodiment of a system 10 for limiting turbocharger rotational speed is shown. System 10 includes an internal combustion engine 12 having an intake manifold 14 fluidly coupled to an outlet of a compressor 16 of a turbocharger 18 via an intake conduit 20, wherein the compressor 16 also includes a compressor inlet coupled to an intake conduit 22 for receiving fresh ambient air. The turbocharger compressor 16 is mechanically coupled to a turbine 24 via a drive shaft 25, wherein turbine 24 includes a turbine inlet fluidly coupled to an exhaust manifold 26 of engine 12 via an exhaust conduit 28, and further includes a turbine outlet fluidly coupled to ambient via an exhaust conduit 30.

System 10 includes a control computer 32 that is illustratively microprocessor-based and is generally operable to control and manage the overall operation of engine 12. Control computer 32 includes a memory unit 35 as well as a number of inputs and outputs for interfacing with various sensors and systems coupled to engine 12. Control computer 32, in one embodiment, may be a known control unit sometimes referred to as an electronic or engine control module (ECM), electronic or engine control unit (ECU) or the like, or may alternatively be a general purpose control circuit capable of operation as will be described hereinafter. In any case, control computer 32 includes one or more control algorithms, as will be described in greater detail hereinafter, for limiting turbocharger rotational speed based on input signals provided by a number of engine and/or turbocharger operating condition sensors.

Control computer 32 includes a number of inputs for receiving signals from various sensors or sensing systems associated with system 10. For example, system 10 includes a temperature sensor 34 disposed in fluid communication with intake conduit 22 and electrically connected to a compressor inlet temperature input, CIT, of the control computer 32 via signal path 36. Sensor 34 may be of known construction and generally operable to produce a temperature signal on signal path 36 that is indicative of the temperature of ambient air at the inlet of compressor 16 (i.e., entering the intake conduit 22). It is to be understood that for the purposes of the present invention, sensor 34 need not be disposed in fluid communication with intake conduit 22 and may instead be positioned in any convenient location relative to system 10 as long as sensor 34 is operable to produce a signal on signal path 36 that is indicative of the temperature of fresh ambient air at the inlet of the compressor 16. Alternatively or additionally, the control computer 32 may include one or more known software algorithms for estimating the compressor inlet temperature as a function of one or more engine and/or air handling operating conditions. For example, the control computer 32 may include a software algorithm for estimating the compressor inlet temperature as the sum of a society of automotive engineers (SAE) standard day temperature for a given compressor inlet pressure, in ° F., and 30° F. Those skilled in the art will recognize other known software algorithms for estimating the compressor inlet temperature, and any such other compressor inlet temperature estimation algorithms are intended to fall within the scope of the claims appended hereto. In any case, the "sensor" for determining "compressor inlet temperature" and/or "temperature at the inlet of the compressor", as these terms are used herein, is intended to encompass any physical sensor producing a corresponding sensor signal indicative of compressor inlet temperature, one or more known software algorithms estimating the compressor inlet temperature as a function of one or more other engine and/or air handling system operating conditions, and/or a combination thereof.

System 10 further includes a pressure sensor 38 that is disposed in fluid communication with intake conduit 22 and electrically connected to a compressor inlet pressure input, CIP, of control computer 32 via signal path 40. Sensor 38 may be of known construction and is generally operable to produce a pressure signal on signal path 40 that is indicative of the pressure of ambient air at the inlet of compressor 16 (i.e., entering intake conduit 22). It is to be understood that for the purposes of the present invention, sensor 38 need not be disposed in fluid communication with intake conduit 22 and may instead be positioned in any convenient location relative to system 10 as long as sensor 38 is operable to produce a signal on signal path 40 that is indicative of the pressure of ambient air at the inlet of conduit 22. Alternatively or additionally, the control computer 32 may include one or more known software algorithms for estimating the compressor inlet pressure as a function of one or more engine and/or air handling operating conditions. For example, the control computer 32 may include a software algorithm for estimating the compressor inlet pressure as a function of exhaust backpressure under certain engine operating conditions; e.g., under engine idling conditions. Those skilled in the art will recognize other known software algorithms for estimating the compressor inlet pressure, and any such other compressor inlet pressure estimation algorithms are intended to fall within the scope of the claims appended hereto. In any case, the "sensor" for determining "compressor inlet pressure" and/or "pressure at the inlet of the compressor", as these terms are used herein, is intended to encompass any physical sensor producing a corresponding sensor signal indicative of compressor inlet pressure, one or more known software algorithms estimating the compressor inlet pressure as a function of one or more other engine and/or air handling system operating conditions, and/or a combination thereof.

System 10 further includes another temperature sensor 42 that is disposed in fluid communication with the intake manifold 14 and electrically connected to an intake manifold temperature input, IMT, of control computer 32 via signal path 44. Sensor 42 may be of known construction and is generally operable to produce a temperature signal on signal path 44 that is indicative of the temperature within the intake manifold 14.

System 10 further includes another pressure sensor 46 disposed in fluid communication with the intake conduit 20 and electrically connected to a compressor outlet pressure input, COP, of control computer 32 via signal path 48. Alternatively, the pressure sensor 46 may be disposed in fluid communication with the intake conduit 20 anywhere between the outlet of the compressor and the intake manifold 14 or in fluid communication with the intake manifold 14. In any case, the pressure sensor 46 may be of known construction, and is operable to produce a pressure signal on signal path 48 indicative of the pressure at the outlet of the compressor 16. The pressure sensor 46 may sometimes referred to in the art as a so-called "boost pressure" sensor because it is operable to sense changes in pressure (i.e., "boost" pressure) within conduit 20 and intake manifold 14 resulting from the operation of the turbocharger 18. Alternatively, pressure sensor 50 may sometimes be referred to in the art as an intake air pressure sensor, or intake manifold pressure sensor, and for purposes of the present invention, the terms "intake air pressure", "boost pressure", "intake manifold pressure" and "compressor outlet pressure" may be used synonymously.

System 10 further includes an engine speed sensor 50 that is electrically connected to an engine speed input, ES, of the control computer 32 via signal path 52. Sensor 50 may illustratively be a conventional Hall effect sensor operable to sense passage thereby of a number of teeth formed on a gear or tone wheel rotating synchronously with the crankshaft (not shown) of the engine 12. Alternatively, sensor 50 may be a variable reluctance sensor or other known speed sensor, and is in any case operable to produce a speed signal on signal path 52 indicative of the rotational speed of the engine 12.

In some embodiments, the system 10 may further include a mass air flow sensor 54 disposed in fluid communication with the intake air conduit 20 and electrically connected to an engine intake air flow rate input, EFR, of the control computer 32 via signal path 56 as shown in phantom in FIG. 1. Alternatively, the mass air flow sensor 54 in such embodiments may be disposed in fluid communication with the intake manifold 14 or anywhere along the intake air conduit between the outlet of the compressor 16 and the intake manifold 14. In any case, sensor 54 may be of known construction, and is operable to produce a mass air flow signal on signal path 56 indicative of the mass flow rate of air supplied by the compressor 16 to the engine 12 via the intake manifold 14.

The control computer 32 also includes one or more outputs for controlling the swallowing capacity and/or efficiency of the turbocharger turbine 24, wherein the term "turbocharger swallowing capacity" or "swallowing capacity of the turbine" is defined for purposes of this document as the exhaust gas flow capacity of the turbocharger turbine 24 and the term "turbocharger efficiency" or "efficiency of the turbine" refers to the ability of the turbocharger turbine 24 to process the flow of exhaust gas exiting the exhaust manifold 26. In the illustrated example, a single air handling control output, AHC, is shown electrically connected to a control mechanism 62 for controlling the swallowing capacity or efficiency of the turbine 24 via signal path 64, wherein the illustrated control mechanism 62 may include one or more mechanisms for controlling the swallowing capacity and/or efficiency of the turbine 24. The control computer 32 is operable to control the operation of the control mechanism 72, by producing one or more appropriate signals signal path 64, to control the swallowing capacity of the turbine 24 and/or the efficiency of the turbine 24.

Figure 2A:
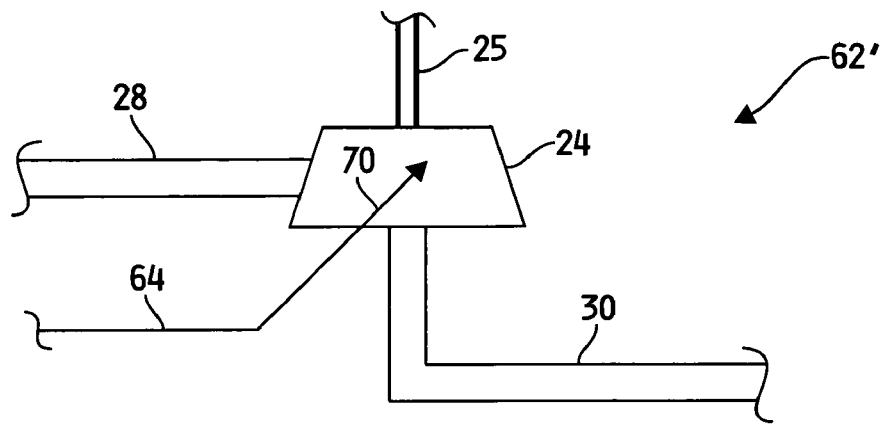
FIG. 2A is a schematic and block diagram of one illustrative mechanism for controlling the swallowing capacity or efficiency of the turbocharger of FIG. 1.
Figure 2B:
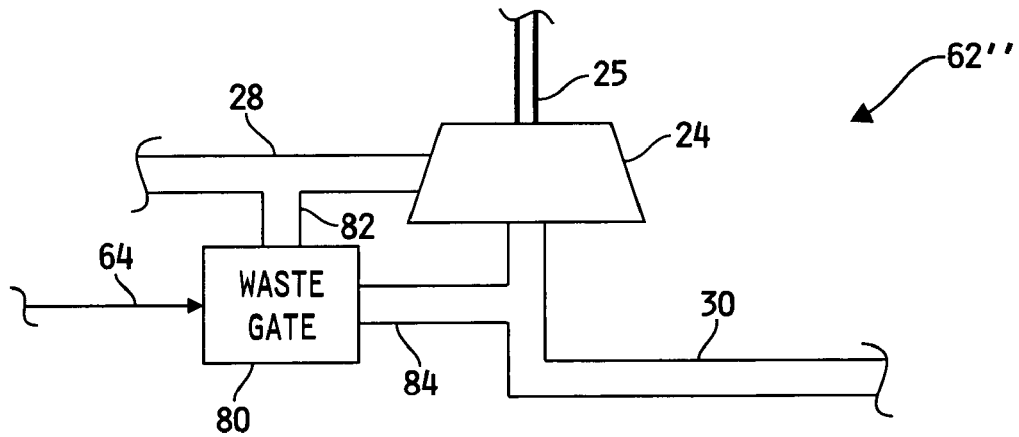
FIG. 2B is a schematic and block diagram of another illustrative mechanism for controlling the swallowing capacity or efficiency of the turbocharger of FIG. 1.
Figure 2C:
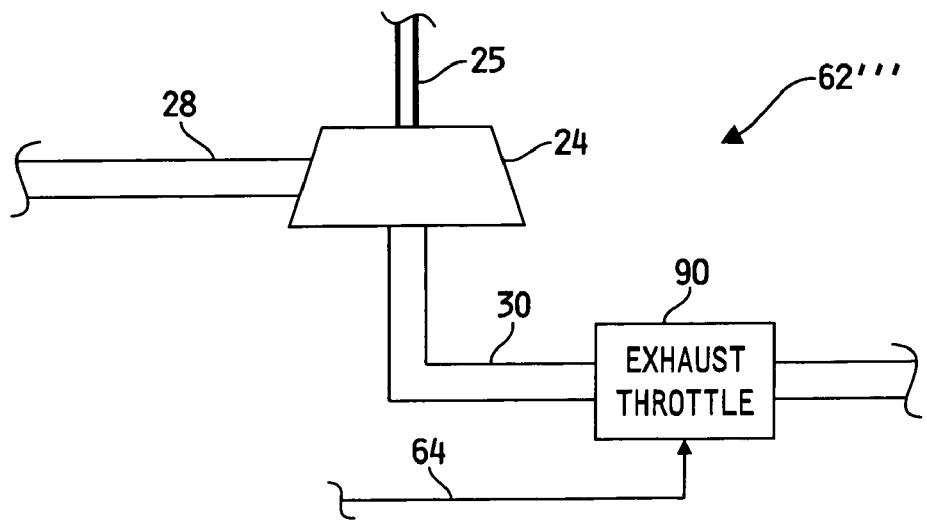
FIG. 2C is a schematic and block diagram of yet another illustrative mechanism for controlling the swallowing capacity or efficiency of the turbocharger of FIG. 1.

In general, the swallowing capacity and/or efficiency of the turbine 24 directly affects a number of engine operating conditions including, for example, but not limited to, compressor outlet pressure, turbocharger rotational speed and exhaust pressure, and exemplary embodiments of some turbocharger swallowing capacity or efficiency control mechanisms 64 are illustrated in FIGS. 2A–2C. Referring to FIG. 2A for example, one illustrative control mechanism 62' that may be included within system 10 to control the swallowing capacity of the turbine 24 is a conventional electronically controllable variable geometry turbocharger turbine. In this regard, turbine 24 includes a variable geometry actuator 70 electrically connected to the air handling system control output, AHC, of the control computer 32 via signal path 64. In the illustrated embodiment, the control computer 32 is operable to produce a variable geometry turbocharger control signal on signal path 64, and variable geometry turbocharger actuator 70 is responsive to this control signal to control the swallowing capacity (i.e., exhaust gas flow capacity) of turbine 24 by controlling the flow geometry of turbine 24 in a known manner.

Referring now to FIG. 2B, another illustrative control mechanism 62" that may be included within system 10 to control the efficiency of the turbine 24 is a conventional electronically controllable wastegate 80 electrically connected to the air handling system control output, AHC, of the control computer 32 via signal path 64. The wastegate valve has an inlet fluidly coupled to exhaust conduit 28 upstream of the inlet of the turbine 24 via conduit 82, and an outlet fluidly coupled to exhaust conduit 330 downstream of the outlet of the turbine 24 via conduit 84. In the illustrated embodiment, the control computer 32 is operable to produce a wastegate control signal on signal path 64, and the wastegate 80 is responsive to this control signal to control the position of wastegate valve 80 relative to a reference position. The position of wastegate 80 defines a cross-sectional flow area therethrough, and by controlling the cross-sectional flow area of the wastegate 80, the control computer 32 is operable to selectively modify the efficiency of the turbine 26 by diverting exhaust gas through the wastegate 80 and away from exhaust gas inlet of the turbine 26.

Referring now to FIG. 2C, another illustrative control mechanism 62′″ that may be included within system 10 to control the efficiency of the turbine 24 is a conventional exhaust throttle 90 electrically connected to the air handling system control output, AHC, of the control computer 32 via signal path 64. In the illustrated embodiment, the exhaust throttle 90 is disposed in-line with exhaust conduit 30, although it will be appreciated that the exhaust throttle 90 may alternatively be disposed in-line with exhaust conduit 28. In either case, the control computer 32 is operable to produce an exhaust throttle control signal on signal path 64, and exhaust throttle 90 is responsive to this control signal to control the position of exhaust throttle 70 relative to a reference position. The position of exhaust throttle 90 defines a cross-sectional flow area therethrough, and by controlling the cross-sectional flow area of the exhaust throttle 90, control computer 32 is operable to selectively modify the efficiency of the turbine by controlling the flow rate of exhaust gas through the turbine 24.

It is to be understood that system 10 may include any one or combination of the control mechanisms 62′, 62″ and/or 62′″ illustrated in FIGS. 2A–2C. The control computer 32 may be configured to control any one or combination of such control mechanisms 62 to thereby control the swallowing capacity and/or the efficiency of the turbine 24 as just described.

Based on conventional turbocharger compressor flow dynamics, it is well known in the art that given any two of the following variables, the remaining may be uniquely determined:

[TS/sqrt(CIT), COP/CIP, MAF*sqrt(CIT)/CIP], wherein,

MAF is the mass flow of air exiting the outlet of the compressor 16, and therefore represents the mass flow of air entering the engine 12 via the intake manifold 14, CIT is the temperature of air at the inlet of the compressor 16, CIP is the pressure of air at the inlet of the compressor 16, COP is the pressure of air at the outlet of the turbocharger compressor 16, and TS is the rotational speed of the turbocharger 18.

In the above relationships, the term TS/sqrt(CIT) refers to a temperature-corrected turbocharger speed, hereinafter referred to as CTS, the term COP/CIP refers to a compressor pressure ratio, hereinafter represented as PR and the term MAF*sqrt(CIT)/CIP refers to an inlet temperature and inlet pressure corrected compressor outlet mass flow rate, hereinafter represented as CMAF.

Figure 3:
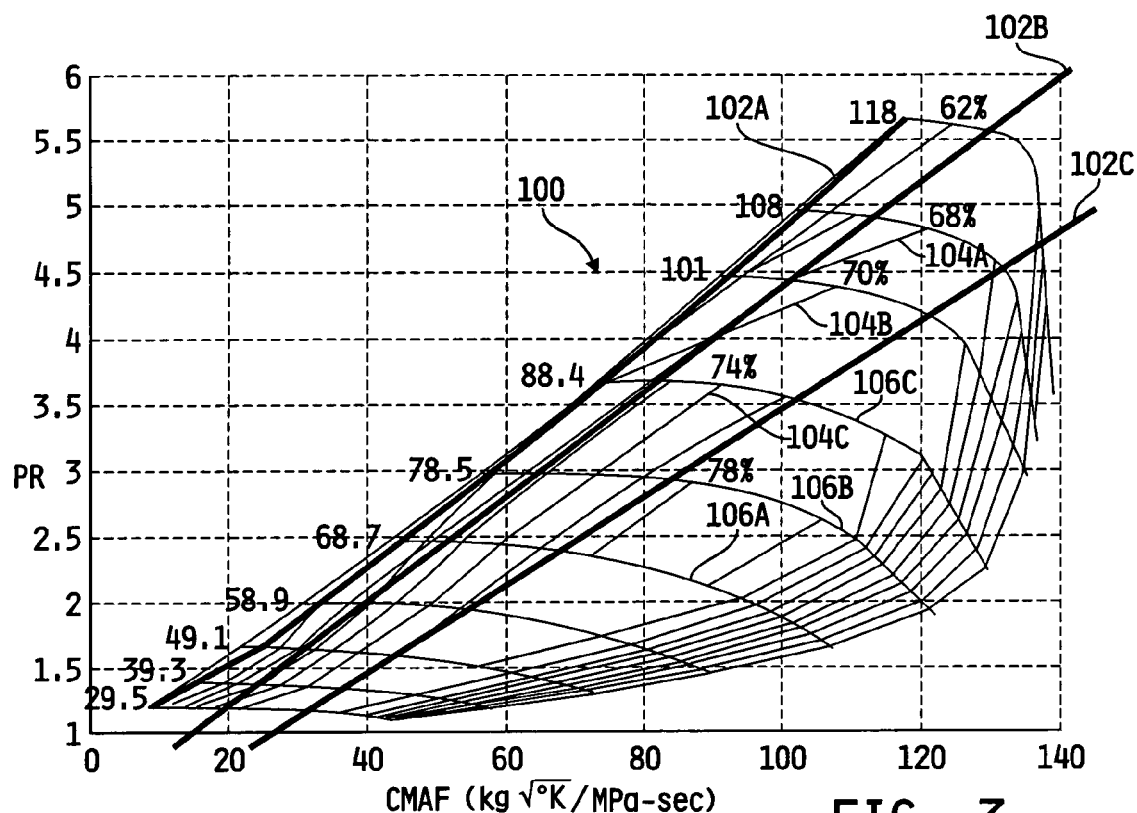
FIG. 3 is a compressor map of turbocharger compressor ratio vs. intake mass air flow illustrating conventional operation of a turbocharger.

Relationships between CTS, PR and CMAF may be represented by a compressor map of the type illustrated in FIG. 3. Referring to FIG. 3, an example compressor map for one known turbocharged engine is shown as a plot 100 of compressor pressure ratio, PR, vs. corrected compressor mass flow rate, CMAF. The various vertically slanted/upwardly sloping lines in plot 100 represent lines of constant compressor efficiency. For example, line 104A corresponds to 68% compressor efficiency, 104B corresponds to 70% compressor efficiency, line 104C corresponds to 74% compressor efficiency, etc. Conversely, the horizontal/downwardly sloping lines in plot 100 represent lines of constant temperature-corrected turbocharger rotational speed, CTS. For example, line 106A corresponds to 68,700 RPM/sqrt(CIT), line 106B corresponds to 78,500 RPM/sqrt(CIT), line 106C corresponds to 88,400 RPM/sqrt(CIT), etc. Finally, the upwardly diagonal thick lines in plot 100 represent lines of constant engine rotational speed, ES. For example, line 102A corresponds to 850 RPM, line 102B corresponds to 1200 RPM, line 102C corresponds to 1800 RPM, etc.

In relation to plot 100, the pressure ratio, PR, can be estimated from the compressor map plot 100 according to the equation:

$$PR = f(CTS, CMAF) \quad (1).$$

Figure 4:
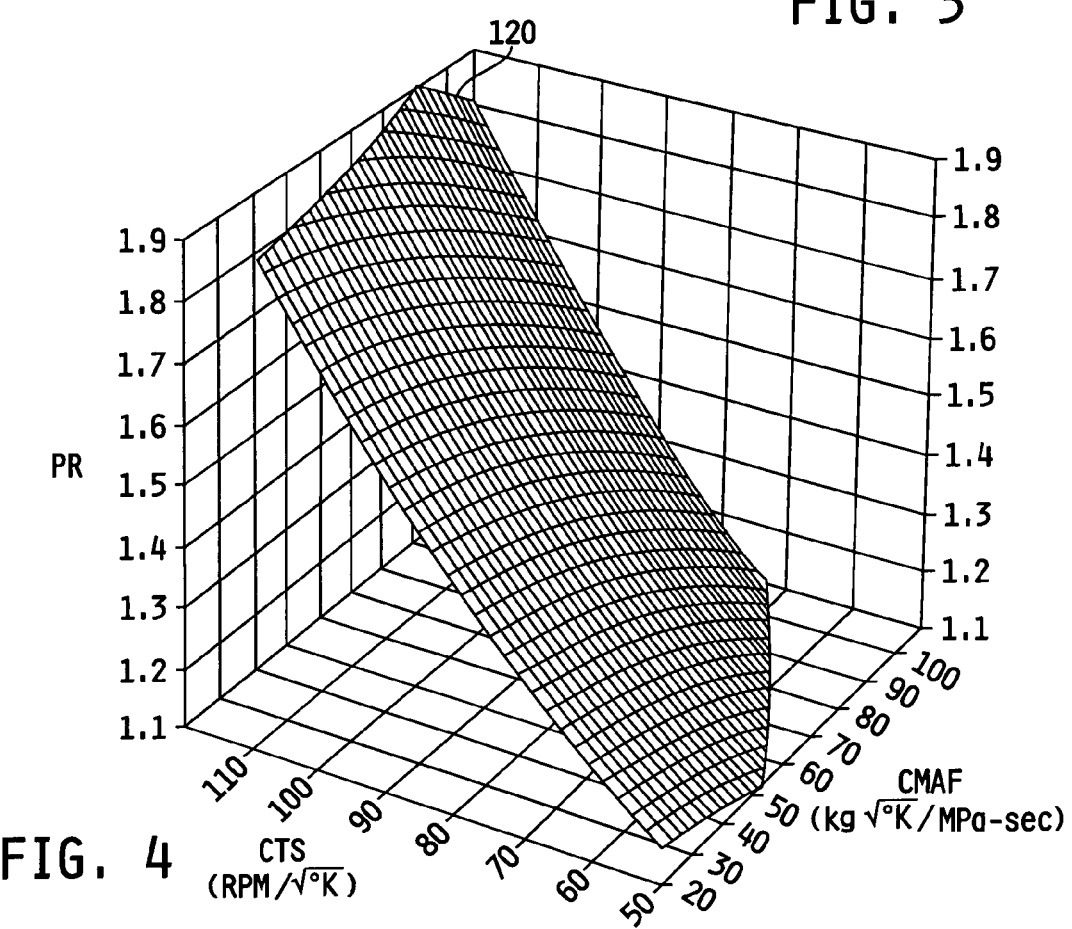
FIG. 4 is a 3-D plot of one illustrative technique for estimating maximum allowable compressor outlet pressure values by mapping a corrected maximum allowable turbocharger speed and current values of corrected intake mass air flow to maximum allowable turbocharger compressor ratio values.

From the plot 100 illustrated in FIG. 3, the 3-dimensional plot 120 of FIG. 4 is generated in a known manner for an example engine 12 and associated air handling system 18, etc. of the type illustrated in FIG. 1. The 3-D plot of FIG. 4 represents one illustrative map of the pressure ratio, PR, as a function of the corrected turbocharger speed, CTS, and the corrected mass airflow, CMAF. From the plot 120 of FIG. 4, an estimated compressor outlet pressure, $COP_E$, may thus be defined by the equation:

$$COP_E = CIP * f\{[TS/\text{sqrt}(CIT)], MAF * \text{sqrt}(CIT)/CIP\} \quad (2).$$

In one illustrative embodiment, the system 10 of in FIG. 1 is configured to determine from the plot or map 120 a maximum compressor outlet pressure value, $COP_{MAX}$, based on a measured or estimated value of CMAF and on a specified maximum turbocharger rotational speed value, $TS_{MAX}$. Substituting such information into equation (2) results in the following equation:

$$COP_{MAX} = CIP * f\{[TS_{MAX}/\text{sqrt}(CIT)], [MAF*\text{sqrt}(CIT)/CIP]\} \quad (3).$$

With the maximum compressor outlet pressure determined from equation (3), the system 10 is further configured in this embodiment to control the control mechanism(s) 62 based on $COP_{MAX}$ to control the swallowing capacity and/or efficiency of the turbine 24 in a manner that limits the actual compressor outlet pressure, COP, to the $COP_{MAX}$ to thereby limit turbocharger rotational speed, TS, to the specified maximum turbocharger rotational speed value, $TS_{MAX}$. Further details relating to this embodiment will be described hereinafter with respect to FIG. 6.

Observation of plot 100 of FIG. 3 reveals that the compressor pressure ratio, PR, is more sensitive to changes in temperature-corrected turbocharger speed, CTS, than to corrected compressor mass flow, CMAF, and is therefore a stronger function of CTS than of CMAF. Additionally, as described hereinabove, knowledge of current engine speed, ES, enables mapping of compressor pressure ratio fluctuations to constant temperature-corrected turbocharger speed values as illustrated in FIG. 3 by constant engine speed lines 102A–102C. Accordingly, the relationship of equation (1) may be simplified to the equation:

$$PR = f(CTS, ES) \tag{4}$$

From the plot 100 illustrated in FIG. 3, the 3-dimensional plot 140 of FIG. 5 is generated in a known manner for an example engine 12 and associated air handling system 18, etc. of the type illustrated in FIG. 1. The 3-D plot 140 of FIG. 5 represents another illustrative map of the pressure ratio, PR, as a function of the corrected turbocharger speed, CTS, and the engine speed, ES. From the plot 140 of FIG. 5, an estimated compressor outlet pressure, $COP_E$, may thus be defined by the equation:

$$COP_E = CIP * f\{[TS/\text{sqrt}(CIT)], ES\} \tag{5}$$

In another illustrative embodiment, the system 10 of in FIG. 1 is configured to determine from the plot or map 140 a maximum compressor outlet pressure value, $COP_{MAX}$, based on a measured value of ES and on a specified maximum turbocharger rotational speed value, $TS_{MAX}$. Substituting such information into equation (5) results in the following equation:

$$COP_{MAX} = CIP * f\{[TS_{MAX}/\text{sqrt}(CIT)], ES\} \tag{6}$$

With the maximum compressor outlet pressure determined from equation (6), the system 10 is further configured in this embodiment to control the control mechanism(s) 62 based on $COP_{MAX}$ to control the swallowing capacity and/or efficiency of the turbine 24 in a manner that limits the actual compressor outlet pressure, COP, to the $COP_{MAX}$ to thereby limit turbocharger rotational speed, TS, to the specified maximum turbocharger rotational speed value, $TS_{MAX}$. Further details relating to this embodiment will be described hereinafter with respect to FIG. 7.

Referring now to FIG. 6, a flowchart of one illustrative software algorithm 150 for limiting turbocharger rotational speed to a maximum turbocharger rotational speed by limiting turbocharger compressor outlet pressure to a corresponding maximum turbocharger compressor outlet pressure is shown. In the illustrated embodiment, the algorithm 150 is stored within memory 35 and executed in a known manner by control computer 32, although the algorithm 150 may alternatively be executed by another controller or processor and information may be shared with the control computer 32 via a suitable data bus or link. For description purposes, however, algorithm 150 will be described as being executed by the control computer 32.

Algorithm 150 begins at step 152 where control computer 32 is operable to determine the compressor inlet temperature, CIT, via information provided by pressure sensor 34 (FIG. 1) and/or by one or more known software algorithms for estimating compressor inlet temperature as described hereinabove. Thereafter at step 154, the control computer 32 is operable to determine the compressor inlet pressure, CIP, via information provided by pressure sensor 38 and/or by one or more known software algorithms for estimating compressor inlet pressure as described hereinabove. Thereafter at step 156, the control computer 32 is operable to determine the engine intake flow rate, EFR. In embodiments of system 10 including the MAF sensor 54, the control computer 32 may be operable at step 156 to determine EFR via information provided by the MAF sensor 54. In embodiments of system 10 that do not include the MAF sensor 54, the control computer 32 includes one or more conventional software algorithms for estimating the engine intake air flow rate as a function of other engine and air handling system operating conditions.

By way of illustration, the control computer 32 may include one or more software algorithms configured to determine the engine intake air flow rate, EFR, by first estimating a volumetric efficiency, η, of the air intake system, and then computing EFR as a function of η using a conventional speed/density equation. Any known technique for estimating η may be used, and in one embodiment η is computed according to a known Taylor mach number-based volumetric efficiency equation given as:

$$\eta = A_1 * \{(Bore/D)^{2} * [(\text{stroke} * ES)^{B}/\text{sqrt}(\gamma * R * IMT)] * (1 + A_2)\} + A_3 \tag{7}$$

where, $A_1$, $A_2$, $A_3$ and B are all calibratible parameters preferably fit to the volumetric efficiency equation based on mapped engine data, Bore is the intake valve bore length, D is the intake valve diameter, stroke is the piston stroke length, wherein Bore, D and stroke are generally dependent upon engine geometry, γ and R are known constants (e.g., γ*R=387.414 KJ/kg/deg K), ES is engine speed, and IMT = intake manifold temperature.

With the volumetric efficiency value η estimated according to equation (7), the estimated engine intake air flow rate, EFR, is computed according to the equation:

$$EFR = \eta * V_{DIS} * ES * COP/(2 * R * IMT) \tag{8}$$

where,

η is the estimated volumetric efficiency, $V_{DIS}$ is engine displacement and is generally dependent upon engine geometry, ES is engine speed, COP is the compressor outlet pressure, R is a known gas constant (R=54), and IMT is the intake manifold temperature.

In embodiments of system 10 in which the air handling system includes an exhaust gas recirculation (EGR) system, the control computer 32 is generally operable to determine the engine intake air flow rate, EFR, as just described, but must also account for the additional mass flow into the engine 12 attributable to the recirculated exhaust gas. Details relating to one known system for estimating EGR mass flow are provided in co-pending U.S. patent application Ser. No. 09/774,897, entitled SYSTEM AND METHOD FOR ESTIMATING EGR MASS FLOW AND EGR FRACTION, which is assigned to the assignee of the present invention, and the disclosure of which is incorporated herein by reference. In this embodiment, the control computer 32 is operable to estimate a total flow rate of charge entering the engine 12, for example by using a known variant of equation (7) that takes into account exhaust gas pressure or a delta pressure across an EGR flow restriction device, to estimate an EGR mass flow rate, and to determine the engine intake air flow rate, EFR, as a difference between the total charge flow rate and the EGR mass flow rate.

Execution of the algorithm 150 advances from step 156 to step 158 where the control computer 32 is operable to determine the maximum turbocharger rotational speed value, $TS_{MAX}$. In one embodiment, $TS_{MAX}$ may be a calibratible constant stored in memory 35. Alternatively, $TS_{MAX}$ may be a dynamic function of one or more engine and/or air handling system operating conditions, such as ambient temperature, engine coolant temperature or the like. Those skilled in the art will recognize other engine and/or air handling system operating conditions or other conditions from which $TS_{MAX}$ may be dynamically derived, and any such techniques for determining $TS_{MAX}$ are intended to fall within the scope of the claims appended hereto.

In any case, algorithm execution advances from step 158 to step 160 where the control computer 32 is operable to determine the maximum compressor outlet pressure, $COP_{MAX}$, as a function of CIT, CIP, EFR and $TS_{MAX}$ as defined hereinabove by equation (3). The control computer 32 may be configured to execute step 160 using any conventional technique for mapping the variables CTS, CIP, EFR and $TS_{MAX}$ of equation (3) to corresponding maximum compressor outlet pressure values, $COP_{MAX}$. In one embodiment, for example, the data in plot 120 may be stored in memory 35 in graphical or table form, and the control computer 32 may be operable to execute step 160 by mapping current values of CTS and CMAF to PR using the stored information for plot 120, and thereafter compute $COP_{MAX}$ by multiplying the resulting PR value by the current value of CIP. In the mapping of current values of CTS and CMAF to PR, estimation values in between data points may be obtained using known linear or non-linear interpolation techniques. One or more alternative techniques may be used for mapping the variables CTS, CIP, EFR and $TS_{MAX}$ of equation (3) to corresponding maximum compressor outlet pressure values, $COP_{MAX}$, and examples of some such alternative techniques are disclosed in pending U.S. patent application Ser. No. 10/101,887, entitled SYSTEM FOR ESTIMATING ABSOLUTE BOOST PRESSURE IN A TURBOCHARGED INTERNAL COMBUSTION ENGINE, which is assigned to the assignee of the present invention, and the disclosure of which is incorporated herein by reference. Such alternative techniques for mapping the variables CTS, CIP, EFR and $TS_{MAX}$ of equation (3) to corresponding maximum compressor outlet pressure values, $COP_{MAX}$, as well as any other known mapping techniques, are intended to fall within the scope of the claims appended hereto.

Those skilled in the art will recognize that the accuracy of the maximum compressor outlet pressure estimate, $COP_{MAX}$, may be further improved by considering additional engine operating conditions such as, for example, intake manifold temperature (IMT), and in embodiments of the system 10 that include and EGR system, the EGR flow rate. In general, it will be recognized that there exists a tradeoff between estimate accuracy and model complexity, and it will accordingly be appreciated that the application requirements will generally dictate the required accuracy which will, in turn, dictate the model complexity.

Following step 160, the control computer 32 is operable at step 162 to control the air handling system in a manner that limits the compressor outlet pressure, COP, to the maximum compressor outlet pressure, $COP_{MAX}$, to thereby limit the turbocharger rotational speed, TS, to the specified maximum turbocharger rotational speed, $TS_{MAX}$. In the illustrated embodiment, the control computer 32 is operable to execute step 162 by controlling one or more of the control mechanisms 62 that control the swallowing capacity and/or efficiency of the turbocharger turbine 24. For example, in embodiments of the system 10 and turbocharger 18 that include a variable geometry turbine mechanism 70 (FIG. 2A), the control computer 32 may be operable at step 162 to control the variable geometry turbine in a manner that reduces the swallowing capacity of the turbine 24 as the compressor outlet pressure, COP, approaches $COP_{MAX}$ to thereby limit COP to $COP_{MAX}$. Likewise in embodiments of the system 10 and turbocharger 18 that include a wastegate 80, the control computer 32 may be operable at step 162 to control the wastegate 80 in a manner that reduces the efficiency of the turbine 24 as the compressor outlet pressure, COP, approaches $COP_{MAX}$ to thereby limit COP to $COP_{MAX}$. Similarly in embodiments of the system 10 and turbocharger 18 that include an exhaust throttle 90, the control computer 32 may be operable at step 162 to control the exhaust throttle 90 in a manner that reduces the efficiency of the turbine 24 as the compressor outlet pressure, COP, approaches $COP_{MAX}$ to thereby limit COP to $COP_{MAX}$. In embodiments of the system 10 and turbocharger 18 that include some combination of the variable geometry turbine mechanism 70, the wategate 80 and exhaust throttle 90, the control computer 32 may be operable at step 162 to control any one or combination of these control mechanisms 64 in a manner that limits COP to $COP_{MAX}$.

The control computer 32 may be configured to execute step 162 by controlling the control mechanism(s) 64 accordingly to conventional control techniques. In one embodiment, for example, the control computer 32 may be configured to execute step 162 by first computing a pressure error as the difference between the maximum compressor outlet pressure value, $COP_{MAX}$, and the compressor outlet pressure signal produced by the compressor outlet sensor 46, and then controlling this pressure error to zero or some other minimum value via known control techniques, such via a conventional proportional-integral (PI), proportional-integral-derivative (PID) or other controller. Those skilled in the art will recognize other conventional control techniques for controlling the control mechanisms(s) in a manner that limits COP to $COP_{MAX}$, and any other such conventional control techniques are intended to fall within the scope of the claims appended hereto. In any case, the algorithm 150 may return after executing step 162 to its calling routine, or may instead loop back to step 152 for continual execution of algorithm 150.

Referring now to FIG. 7, a flowchart of another illustrative software algorithm 170 for limiting turbocharger rotational speed to a maximum turbocharger rotational speed by limiting turbocharger compressor outlet pressure to a corresponding maximum turbocharger compressor outlet pressure is shown. In the illustrated embodiment, the algorithm 170 is stored within memory 35 and executed in a known manner by control computer 32, although the algorithm 170 may alternatively be executed by another controller or processor and information may be shared with the control computer 32 via a suitable data bus or link. For description purposes, however, algorithm 170 will be described as being executed by the control computer 32.

Algorithm 170 begins at step 172 where control computer 32 is operable to determine the compressor inlet temperature, CIT, via information provided by pressure sensor 34 (FIG. 1) and/or by one or more known software algorithms for estimating compressor inlet temperature as described hereinabove. Thereafter at step 174, the control computer 32 is operable to determine the compressor inlet pressure, CIP, via information provided by pressure sensor 38 and/or by one or more known software. algorithms for estimating compressor inlet pressure as described hereinabove. Thereafter at step 176, the control computer 32 is operable to determine the engine speed, ES, via information provided by the engine speed sensor 50.

Execution of the algorithm 170 advances from step 176 to step 178 where the control computer 32 is operable to determine the maximum turbocharger rotational speed value, $TS_{MAX}$. In one embodiment, $TS_{MAX}$ may be a calibratible constant stored in memory 35. Alternatively, $TS_{MAX}$ may be a dynamic function of one or more engine and/or air handling system operating conditions, such as ambient temperature, engine coolant temperature or the like. Those skilled in the art will recognize other engine and/or air handling system operating conditions or other conditions from which $TS_{MAX}$ may be dynamically derived, and any such techniques for determining $TS_{MAX}$ are intended to fall within the scope of the claims appended hereto.

In any case, algorithm execution advances from step 178 to step 180 where the control computer 32 is operable to determine the maximum compressor outlet pressure, $COP_{MAX}$, as a function of CIT, CIP, ES and $TS_{MAX}$ as defined hereinabove by equation (6). The control computer 32 may be configured to execute step 180 using any conventional technique for mapping the variables CTS, CIP, EFR and $TS_{MAX}$ of equation (6) to corresponding maximum compressor outlet pressure values, $COP_{MAX}$. In one embodiment, for example, the data in plot 140 may be stored in memory 35 in graphical or table form, and the control computer 32 may be operable to execute step 180 by mapping current values of CTS and ES to PR using the stored information for plot 140, and thereafter compute $COP_{MAX}$ by multiplying the resulting PR value by the current value of CIP. In the mapping of current values of CTS and ES to PR, estimation values in between data points may be obtained using known linear or non-linear interpolation techniques. One or more alternative techniques may be used for mapping the variables CTS, CIP, EFR and $TS_{MAX}$ of equation (6) to corresponding maximum compressor outlet pressure values, $COP_{MAX}$, and examples of some such alternative techniques are disclosed in pending U.S. patent application Ser. No. 10/101,887, entitled SYSTEM FOR ESTIMATING ABSOLUTE BOOST PRESSURE IN A TURBOCHARGED INTERNAL COMBUSTION ENGINE, the disclosure of which has been incorporated herein by reference. Such alternative techniques for mapping the variables CTS, CIP, ES and $TS_{MAX}$ of equation (6) to corresponding maximum compressor outlet pressure values, $COP_{MAX}$, as well as any other known mapping techniques, are intended to fall within the scope of the claims appended hereto.

Those skilled in the art will recognize that the accuracy of the maximum compressor outlet pressure estimate, $COP_{MAX}$, may be further improved by considering additional engine operating conditions such as, for example, intake manifold temperature (IMT), and in embodiments of the system 10 that include and EGR system, the EGR flow rate. In general, it will be recognized that there exists a tradeoff between estimate accuracy and model complexity, and it will accordingly be appreciated that the application requirements will generally dictate the required accuracy which will, in turn, dictate the model complexity.

Following step 180, the control computer 32 is operable at step 182 to control the air handling system in a manner that limits the compressor outlet pressure, COP, to the maximum compressor outlet pressure, $COP_{MAX}$, to thereby limit the turbocharger rotational speed, TS, to the specified maximum turbocharger rotational speed, $TS_{MAX}$. In the illustrated embodiment, the control computer 32 is operable to execute step 182 by controlling one or more of the control mechanisms 62 that control the swallowing capacity and/or efficiency of the turbocharger turbine 24. For example, in embodiments of the system 10 and turbocharger 18 that include a variable geometry turbine mechanism 70 (FIG. 2A), the control computer 32 may be operable at step 182 to control the variable geometry turbine in a manner that reduces the swallowing capacity of the turbine 24 as the compressor outlet pressure, COP, approaches $COP_{MAX}$ to thereby limit COP to $COP_{MAX}$. Likewise in embodiments of the system 10 and turbocharger 18 that include a wastegate 80, the control computer 32 may be operable at step 182 to control the wastegate 80 in a manner that reduces the efficiency of the turbine 24 as the compressor outlet pressure, COP, approaches $COP_{MAX}$ to thereby limit COP to $COP_{MAX}$. Similarly in embodiments of the system 10 and turbocharger 18 that include an exhaust throttle 90, the control computer 32 may be operable at step 182 to control the exhaust throttle 90 in a manner that reduces the efficiency of the turbine 24 as the compressor outlet pressure, COP, approaches $COP_{MAX}$ to thereby limit COP to $COP_{MAX}$. In embodiments of the system 10 and turbocharger 18 that include some combination of the variable geometry turbine mechanism 70, the wategate 80 and exhaust throttle 90, the control computer 32 may be operable at step 182 to control any one or combination of these control mechanisms 64 in a manner that limits COP to $COP_{MAX}$.

The control computer 32 may be configured to execute step 182 by controlling the control mechanism(s) 64 accordingly to conventional control techniques. In one embodiment, for example, the control computer 32 may be configured to execute step 182 by first computing a pressure error as the difference between the maximum compressor outlet pressure value, $COP_{MAX}$, and the compressor outlet pressure signal produced by the compressor outlet sensor 46, and then controlling this pressure error to zero or some other minimum value via known control techniques, such via a conventional proportional-integral (PI), proportional-integral-derivative (PID) or other controller. Those skilled in the art will recognize other conventional control techniques for controlling the control mechanisms(s) in a manner that limits COP to $COP_{MAX}$, and any other such conventional control techniques are intended to fall within the scope of the claims appended hereto. In any case, the algorithm 170 may return after executing step 182 to its calling routine, or may instead loop back to step 172 for continual execution of algorithm 170.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A method of limiting turbocharger rotational speed, the method comprising:

determining an inlet pressure corresponding to pressure of air at an inlet defined by a compressor of the turbocharger;

determining an inlet temperature corresponding to temperature of air at the inlet of the compressor;

determining an operating condition other than the inlet pressure and inlet temperature;

determining a maximum compressor outlet pressure value, corresponding to a maximum allowable pressure at an outlet defined by the compressor, as a function of the inlet pressure, the inlet temperature, the operating condition and a maximum allowable turbocharger speed value; and controlling a turbocharger swallowing capacity or efficiency control mechanism associated with a turbine defined by the turbocharger in a manner that limits compressor outlet pressure to the maximum compressor outlet pressure value to thereby limit rotational speed of the turbocharger to the maximum turbocharger speed value.

2. The method of claim 1 wherein the turbocharger turbine is configured as a variable geometry turbine;

and wherein the step of controlling a turbocharger swallowing capacity or efficiency control mechanism includes controlling the swallowing capacity of the turbine by controlling the geometry of the turbine in a manner that limits the intake manifold pressure to the maximum intake manifold pressure value.

3. The method of claim 1 wherein the turbine defines an inlet fluidly coupled to an exhaust manifold of the engine and an outlet, and wherein a wastegate is fluidly coupled between the turbine inlet and the turbine outlet, the wastegate controllable to selectively direct exhaust gas flowing out of the exhaust manifold through the wastegate and away from the turbine inlet;

and wherein the step of controlling a turbocharger swallowing capacity or efficiency control mechanism includes controlling the efficiency of the turbine by controlling the wastegate in a manner that limits the intake manifold pressure to the maximum intake manifold pressure value.

4. The method of claim 1 wherein the turbine defines an inlet fluidly coupled to an exhaust manifold of the engine and an outlet, and wherein an exhaust throttle is configured to selectively control a flow rate of exhaust gas through the turbine;

and wherein the step of controlling a turbocharger swallowing capacity or efficiency control mechanism includes controlling the efficiency of the turbine by controlling the exhaust throttle in a manner that limits the intake manifold pressure to the maximum intake manifold pressure value.

5. The method of claim 1 wherein the step of determining an operating condition includes determining a mass flow rate value corresponding to a mass flow rate of air supplied to the intake manifold by the turbocharger compressor.

6. The method of claim 5 wherein the step of determining a maximum compressor outlet pressure value includes:

determining a corrected maximum turbocharger speed as a function of the maximum turbocharger speed value and the inlet temperature;

determining a corrected mass flow rate as a function of the mass flow rate value, the inlet temperature and the inlet pressure;

mapping the corrected maximum turbocharger speed and the corrected mass flow rate to a compressor ratio corresponding to a ratio of compressor inlet and outlet pressures; and determining the maximum compressor outlet pressure value as a product of the mapped compressor ratio and the inlet pressure.

7. The method of claim 1 wherein the step of determining an operating condition includes determining engine speed corresponding to rotational speed of the internal combustion engine.

8. The method of claim 7 wherein the step of determining a maximum compressor outlet pressure value includes:

determining a corrected maximum turbocharger speed as a function of the maximum turbocharger speed value and the inlet temperature;

mapping the corrected maximum turbocharger speed and the engine speed to a compressor ratio corresponding to a ratio of compressor inlet and outlet pressures; and determining the maximum compressor outlet pressure value as a product of the mapped compressor ratio and the inlet pressure.

* * * * *